United States Patent [19]

Hauser

[11] 3,837,536
[45] Sept. 24, 1974

[54] PLASTIC INJECTION MOLDING MACHINE
[75] Inventor: Hans Ulrich Hauser, Niederweningen, Switzerland
[73] Assignee: Bucher-Guyer AG Maschinenfabrik, Niederweningen, Switzerland
[22] Filed: July 2, 1973
[21] Appl. No.: 375,963

[30] Foreign Application Priority Data
July 18, 1972  Switzerland................ 10774/72

[52] U.S. Cl............. 222/146 C, 222/259, 222/260, 222/320, 222/404, 222/413
[51] Int. Cl............................................ G01f 11/02
[58] Field of Search........ 222/146 C, 388, 404, 320, 222/256, 257, 259, 260, 254, 410–413; 425/243, 244, 245, 247

[56] References Cited
UNITED STATES PATENTS
| | | | |
|---|---|---|---|
| 2,798,256 | 7/1957 | Etnard | 425/245 |
| 3,540,627 | 11/1970 | Armstead | 222/146 C |
| 3,695,575 | 10/1972 | Hauser | 425/207 X |
| 3,739,958 | 6/1973 | York | 222/404 |

FOREIGN PATENTS OR APPLICATIONS
7,102,909  1/1971  Japan................. 425/247

Primary Examiner—Robert B. Reeves
Assistant Examiner—Charles A. Marmor
Attorney, Agent, or Firm—Werner W. Kleeman

[57] ABSTRACT

An injection molding machine for processing plastics wherein the plastic mass for the injection operation is propelled by means of a packer piston through a shearing gap between the inner wall of an injection cylinder and a rotatably driven plasticizing head into a displacement compartment of the injection cylinder and thus plasticized. The plasticizing head is arranged at a shaft piercingly extending through the packer piston and the packer piston is displaceable up to the region of the plasticizing head. The plasticizing head possesses a greater diameter than the packer piston, and the end surface of a packing cylinder which houses the packer piston and confronting the plasticizing head and the face of the plasticizing head confronting the packing cylinder possesses a further gap arranged ahead of the shearing gap and which can be closed by axial displacement of the plasticizing head or the packer piston.

8 Claims, 1 Drawing Figure

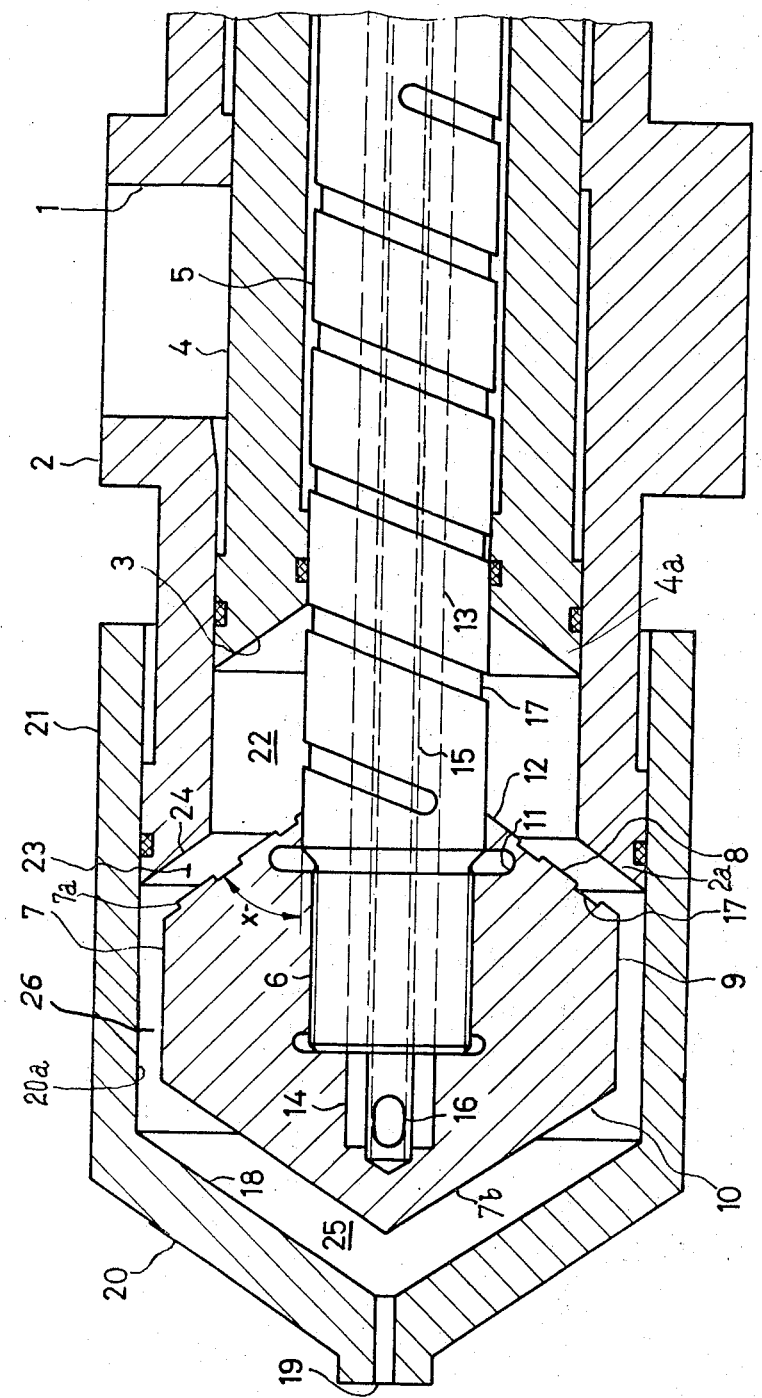

PLASTIC INJECTION MOLDING MACHINE

BACKGROUND OF THE INVENTION

The present invention relates to a new and improved construction of injection molding machine for processing plastics and is of the type wherein the plastic mass intended for the injection molding operation or injection shot is propelled by means of a packer or packing piston through a shearing gap between the inner wall of an injection cylinder and a rotatably driven plasticizing head into a displacememt compartment of the injection cylinder and thus plasticized, and further wherein the plasticizing head is arranged at a shaft piercingly extending through the packer piston and the packer piston is diplaceable up to the location of the plasticizing head.

SUMMARY OF THE INVENTION

It is a primary object of the present invention to provide an improved construction of injection molding machine for processing plastic materials which is relatively simple in construction and design, economical to manufacture, and extremely reliable in operation.

A further object of the present invention aims at the provision of a new and improved construction of injection molding machine for the injection molding of plastic materials in a highly efficient and reliable manner with improved plastification of the mass during the injection molding operation.

Now in order to implement these and still further objects of the invention, which will become more readily apparent as the description proceeds, the invention contemplates that the plasticizing head possesses a greater diameter than the packer piston, that between an end surface of a packing cylinder which houses the packer piston and confronts the plasticizing head and the face of the plasticizing head confronting the packing cylinder there is provided a further gap which is arranged forwardly of the shearing gap and which can be closed by axial displacement of the plasticizing head or the packer piston.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE thereof depicts in vertical axial sectional view an exemplary embodiment of plastic injection molding machine designed according to the teaching of the present invention and wherein for the sake of simplicity in illustration only the more essential components of the plasticizing- and injection unit have been shown.

DETAILED DESCRIPTION OF THE PREFERRED EMBODIMENTS

Considering now the drawing it is to be understood that the plastic mass is generally delivered in granulate form from any suitable and therefore not particularly illustrated supply container through an infeed or filling opening or port 1 to a packing or tamping cylinder 2. Within the packing or tamping cylinder 2 there is displaceably guided a packer or tamping piston 4 provided at its end face 4a with an internal cone or conical portion 3. The packer or tamping piston 4 is driven by any suitable drive, preferably a hydraulic oil drive means of known construction. Through the driven packer piston 4 there piercingly extends a rotatably driven shaft 5 which is detachably connected by threading 6 with a plasticizing head 7. This plasticizing head 7 possesses, at the side or face 7a confronting the shaft 5, an outer cone or conical portion 8, at which merges a cylindrical portion or section 9 and following which there is provided a cone or conical portion 10 at the front face 7b of the plasticizing head 7. This plasticizing head 7 encloses the shaft 5 by means of a sealing lip member 12 formed by a cut-in or otherwise suitably machined groove 11.

The rotatable shaft 5 possesses a lengthwise extending bore 13 which terminates in a blindhole bore 14 of the plasticizing head 7. A cooling agent conduit or line 15 anchored at the blindhole bore 14 and extending through the lengthwise extending bore 13 possesses at the region of the blindhole bore 14 a discharge or outlet opening 16. Helically-shaped or spiral conveying grooves 17 are cut or otherwise suitably formed at the shaft 5 and at the outer cone 8 of the plasticizing head 7.

An injection cylinder 20 provided at its funnel-shaped end wall 18 with an injection nozzle 19 displaceably guided in telescope-like fashion by means of its jacket or outer wall 21 at the filling or packing cylinder 2 and driven by any suitable and therefore non-illustrated drive means mechanically or by hydraulic oil in the direction of the plasticizing head 7. The packing cylinder 2 thus engages in a piston-like fashion with the injection cylinder 20.

The strewable or friable non-plasticized mass is conveyed by a pulsating movement of the packer piston 4 into a packing or tamping compartment 22 which is located between the packer piston 4 and plasticizing head 7, in that the packer or packing piston 4 during each return stroke frees the filling or infeed opening 1 and during the next following forward stroke further advances the friable plastic material. This operation occurs until such a quantity of plastic material as required for an injection shot has been introduced into the filling or packing compartment 22 and at that location has been pre-compacted with a predetermined pressure.

The outer cone 8 of the plasticizing head 7 and an inner cone or cone portion 24 provided at the end face 2a of the packing cylinder 2 form an extension or extended portion 23 of a shearing gap 26 located between the inner wall 20a of the injection cylinder 20 and the plasticizing head 7. Upon completion of the packing- and dosing operation the material which has been introduced into the packing compartment 22 is driven through this extended shearing gap 23 when the plasticizing head 7 is rotatably driven and thus plasticized. Thereafter, the plasticized and homogenized mass arrives at the displacement or ejection compartment 25 of the injection cylinder 20 and which compartment is located in front of the plasticizing head 7, and wherein as a function of the increasing volume of the inflowing mass the injection cylinder 20 which is subjected to a predetermined counter-pressure is displaced, for instance in the showing of the drawing, towards the left. The plasticizing process is terminated when the inner cone 3 of the packer piston 4 has reached the outer cone 8 of the plasticizing head 7, and thus has ejected the entire dosed mass, without any residue remaining, out of the packing compartment 22. This is particularly of significance when processing thermosetting plastics because there can be thus avoided a longer residence time and hardening of a residual mass in the machine. The packing compartment 22 is dimensioned to possess such a size that the maximum injection volume can be plasticized during a single working stroke of the packer piston 4. Consequently, the plasticizing action occurs in a pulse-free manner and continuously, resulting in a very short plasticizing time.

The described arrangement provides a considerable prolongation or extension of the shearing gap — without having to thus correspondingly increase the length of the machine — and accordingly provides for a greater plasticizing output per unit of time, so that large injection shot volumes can be throughput in relatively short cycle times. A large plasticizing capacity or output is particularly then also attainable when the heat delivered to the relatively small mass of the plasticizing head 7 can be withdrawn. This requirement is fulfilled by means of the cooling agent conduit 15 which is conducted up to the region of the core of the plasticizing head 7 during return flow of the cooling agent through the bore 15. Also the conveying grooves 17 are useful for realizing an increased plasticizing output in that such, during plasticizing, prevent a localized immobility and overheating of the material at the rotatable shaft 5 and at the outer cone 8 of the plasticizing head 7 and contribute to a continuous conveying stream or flow of material. It is advantageous for this conveying stream if one-half of the cone angle X of the outer cone 8 is selected so as not to be too large, that is to say, preferably not greater than 60°.

In order to ensure for a constant viscosity of the plasticized mass it is possible to provide control means in order to vary the width of the shearing gap 23. This can occur through axial displacement of the plasticizing head 7, and specifically preferably with automatic regulation as a function of a measurement magnitude, for instance as a function of the pressure exerted, during plastification, upon the packer piston 4.

Prior to ejection of the plasticized mass deposited in the displacement compartment 25 the shaft 5, with interrupted rotational movement, is initially displaced towards the right of the showing of the drawing until the outer cone 8 comes to bear at the inner cone 24 of the packing cylinder 2 and thus sealing closes the compartment 25 with respect to the compartment 22. Then there occurs the injection stroke of the injection cylinder 20 until the funnel-shaped end wall 18 has reached the cone 10 of the plasticizing head 7. Consequently, the plasticized mass is completely displaced out of the compartment 25 and through the injection nozzle 19 into a mold. As already indicated above since conventional drives can be employed for the displaceable components of the injection molding machine such have not been particularly shown in the drawing.

As a modification of the previously described arrangement it is also possible to operate according to extrusion principles. To this end the injection cylinder 20 is brought into a stationary position approximately corresponding to the showing of the drawing, as a result of which there only still remains open an annular gap between its funnel-shaped end wall and the cone 10 of the plasticizing head 7. In this position of the cylinder 20 and with rotating plasticizing head 7 the dosed mess which has been introduced into the packing compartment 22 is propelled through the shearing gap and directly thereafter ejected.

While there is shown and described present preferred embodiments of the invention, it is to be distinctly understood that the invention is not limited thereto, but may be otherwise variously embodied and practiced within the scope of the following claims.

Accordingly, what is claimed is:

1. An injection molding machine for processing plastic masses, comprising an injection cylinder having a displacement compartment, a rotatably driven plasticizing head arranged within said injection cylinder, a shearing gap formed between an inner wall of the injection cylinder and the rotatably driven plasticizing head, a packing cylinder, a packer piston within said packing cylinder for propelling the plastic mass intended for the injection shot through the shearing gap into the displacement compartment of the injection cylinder and to thus plasticize the plastic mass, a shaft piercingly extending through said packer piston, said plasticizing head being mounted at said shaft, said packer piston being displaceable up to the region of the plasticizing head, said plasticizing head possessing a greater diameter than the packer piston, and wherein an end face of the packing cylinder which houses the packer piston and confronting the plasticizing head and a face of the plasticizing head confronting the packing cylinder form a further gap defining an extended shearing gap arranged ahead of said shearing gap, said further gap defining an extended shearing gap being closable by axially displacing the plasticizing head or the packer piston.

2. The injection molding machine as defined in claim 1, wherein said injection cylinder is displaceable with respect to the packing cylinder, said packing cylinder engaging with said injection cylinder in a piston-like fashion.

3. The injection molding machine as defined in claim 1, wherein the plasticizing head and the packing cylinder are relatively displaceable with respect to one another in axial direction.

4. The injection molding machine as defined in claim 1, further including cooling agent circulating means operatively connected with the plasticizing head.

5. The injection molding machine as defined in claim 1, wherein the plasticizing head has an outer cone and said packing cylinder has an inner cone, and wherein said further gap is provided between the outer cone of the plasticizing head and the inner cone of the packing cylinder.

6. The injection molding machine as defined in claim 4, wherein one-half of the cone angle of the inner cone does not exceed 60°.

7. The injection molding machine as defined in claim 4, wherein one-half of the cone angle of the outer cone does not exceed 60°.

8. The injection molding machine as defined in claim 4, wherein the cone angles of the inner cone and the outer cone are equal to one another.

* * * * *